(12) United States Patent
Sasaki

(10) Patent No.: US 9,156,296 B2
(45) Date of Patent: Oct. 13, 2015

(54) IMAGE PROCESSING DEVICE AND COVER ATTACHMENT STRUCTURE

(71) Applicant: Seiko Epson Corporation, Tokyo (JP)

(72) Inventor: Toshiyuki Sasaki, Yamagata-mura (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 14/165,058

(22) Filed: Jan. 27, 2014

(65) Prior Publication Data

US 2014/0139085 A1    May 22, 2014

Related U.S. Application Data

(63) Continuation of application No. 13/398,774, filed on Feb. 16, 2012, now Pat. No. 8,662,631.

(30) Foreign Application Priority Data

Feb. 18, 2011    (JP) .................................. 2011-032927

(51) Int. Cl.
  *B41J 29/13*    (2006.01)
  *G06T 1/00*    (2006.01)
  *E06B 3/34*    (2006.01)

(52) U.S. Cl.
  CPC . *B41J 29/13* (2013.01); *E06B 3/34* (2013.01); *G06T 1/0007* (2013.01)

(58) Field of Classification Search
  CPC ...... B41J 2/16505; B41J 2/16508; B41J 3/28; B41J 3/283
  See application file for complete search history.

(56) References Cited

U.S. PATENT DOCUMENTS

| 6,109,521 A | 8/2000 | Martinez et al. |
| 7,537,211 B2 | 5/2009 | Furihata et al. |
| 8,025,360 B2 * | 9/2011 | Takahashi ....................... 347/29 |

(Continued)

FOREIGN PATENT DOCUMENTS

| EP | 1939790 A1 | 7/2008 |
| EP | 1959404 A2 | 8/2008 |

(Continued)

OTHER PUBLICATIONS

Non-Final Office Action, dated Jun. 18, 2013, of corresponding parent U.S. Appl. No. 13/398,774.

(Continued)

*Primary Examiner* — Shelby Fidler
*Assistant Examiner* — Tracey McMillion
(74) *Attorney, Agent, or Firm* — Kilpatrick Townsend & Stockton LLP

(57) ABSTRACT

An image processing device allows for easy removal of a process medium stuck in the conveyance path while protecting the image processing unit from the outside. In many embodiments, the device includes a conveyance path for conveying process media in a specific conveyance direction, an image processing unit having an ejection surface (process surface) disposed facing the conveyance path, and a first cover and a second cover disposed along the conveyance path and covering the conveyance path. Typically, the first and second covers open and close by pivoting on first and second pivot pins disposed in a direction intersecting the conveyance direction, and the first and second pivot pins are disposed adjacent the conveyance path upstream and downstream of the portion of the conveyance path facing the ejection surface.

16 Claims, 4 Drawing Sheets

(56) References Cited

U.S. PATENT DOCUMENTS

| | | | | |
|---|---|---|---|---|
| 2008/0156875 A1* | 7/2008 | Kinoshita et al. | ............. | 235/449 |
| 2012/0256370 A1* | 10/2012 | Kozaki | .......................... | 271/264 |

FOREIGN PATENT DOCUMENTS

| | | | |
|---|---|---|---|
| JP | 2005-350268 A | 12/2005 | |
| JP | 2008-207927 A | 9/2008 | |

OTHER PUBLICATIONS

Notice of Allowance, dated Oct. 11, 2013, of corresponding parent U.S. Appl. No. 13/398,774.

Examination Report, dated Jun. 5, 2012, of related European Application No. 12155972.8. 5 pages.

Product brochure of LS 150 Highest Performance Teller Scanner. http://www.wholesalecheckscanners.com/PDF/CTS_LS150_Check_Scanner_Brochure.pdf. Electronically accessed on Jan. 21, 2014. 2 pages.

LS150 Maintenance Procedures. http://www.aqubanc.com/documents/support/CTS_LS150_Maintenance_Procedures_R2.0.pdf. Electronically accessed on Jan. 21, 2014. 7 pages.

Extended European Search Report, dated Mar. 12, 2014, of corresponding EP Application No. 14152977.6.

\* cited by examiner

IMAGE PROCESSING DEVICE AND COVER ATTACHMENT STRUCTURE

This application is a continuation of U.S. application Ser. No. 13/398,774 filed on Feb. 16, 2012, which claims priority to Japanese Patent Application No. 2011-032927, filed Feb. 18, 2011, the entireties of which are incorporated by reference herein.

BACKGROUND

1. Technical Field

The present invention relates to an image processing device that applies image processes such as printing and scanning processes to process media including checks and recording paper, and to a structure for attaching a cover to the image processing device.

2. Related Art

Check processing devices, often used at bank teller windows for example, that can print on checks and read check information depending upon the content of the particular check process are known from the literature. See, for example, Japanese Unexamined Patent Appl. Pub. JP-A-2008-207927, which describes a check processing device having plural roller pairs disposed along a U-shaped conveyance path through which checks and other processed media are conveyed for processing, that conveys a check or other slip by passing it sequentially from one roller pair to the next. An image scanner, magnetic head, and print unit are disposed along the conveyance path and used to image, read magnetic information from, and print on the checks or other processed media (referred to below as simply checks).

When a check becomes jammed in the conveyance path in this check processing device, the check must be removed from the conveyance path. To enable this, the check processing device described in JP-A-2008-207927 has a pair of covers that can pivot on a support shaft disposed in the center of the U-shaped conveyance path so that the covers can be opened when a check becomes stuck in the conveyance path. This makes removing a check stuck in the conveyance path easier by opening the covers and exposing the conveyance path to the outside.

While checks jammed in the conveyance path can be removed with the image processing device described in JP-A-2008-207927, the print unit can also be easily accessed from the outside because the print unit is exposed to the outside when the covers are open. Thus, the user can accidentally touch the print unit, which may damage the print unit.

SUMMARY

The present invention relates to an image processing device and a cover attachment structure that enable easy removal of processed media stuck in the conveyance path of the image processing device while also protecting the print unit and other image processing units from external exposure and potential damage.

One aspect of the invention is an image processing device having a conveyance path along which the device conveys process media in a specific conveyance direction; an image processing unit having a process surface disposed facing the conveyance path; first and second pivot pins extending in a direction that intersects the direction of conveyance adjacent the pins and are disposed along or adjacent the conveyance path with the process surface facing a portion of the conveyance path passing therebetween; and a first cover and a second cover that are disposed along the conveyance path and cover or enclose the conveyance path, and can open and close pivoting respectively on the first and second pivot pins. Typically, the first and second pivot pins are attached to the device so as to pivot about a pivotal axis that extends in a direction transverse to or intersects the conveyance direction, preferably substantially perpendicular to a plane through which the conveyance path extends.

By disposing the process surface near an area between the first and second pivot pins in the image processing device according to this aspect of the invention, the first cover and the second cover remain beside the process surface even when the covers are in an open position. As a result, the image processing unit can be protected from the outside even when the covers are opened to remove process media stuck in the conveyance path.

In an image processing device according to another aspect of the invention, the first pivot pin and the second pivot pin are preferably disposed respectively on the upstream side and downstream side of the process surface in the conveyance direction.

With the image processing device according to this aspect of the invention, the positions of the first pivot pin and the second pivot pin do not change even when the cover rotates, access to the image processing unit from the upstream side and downstream side of the conveyance path is prevented, and the image processing unit is protected from the outside.

In another aspect of the invention, preferably, the first and second covers can rotate to a position opposite the process surface with the conveyance path therebetween when in the open position.

In an image processing device according to this aspect of the invention, because the first and second covers can rotate to a position opposite the process surface with the conveyance path therebetween, the process surface is closed off by the first and second covers, and the image processing unit can be more reliably protected from the outside.

Even more preferably, the first cover and the second cover pivot horizontally.

In an image processing device according to this aspect of the invention, because the weight of the covers does not cause the covers to return to the closed position after the covers are opened, the image processing unit can be more reliably protected from the outside than in a configuration in which the first cover and the second cover pivot vertically.

Another aspect of the invention is an image processing device including: a conveyance path that conveys process media; an image processing unit disposed in a middle part of the conveyance path; and a pair of covers that are disposed along the conveyance path and cover the conveyance path, and are supported to open and close on a pair of pivot pins disposed to the middle part of the conveyance path; the image processing unit being disposed opposite the pair of pivot pins with the conveyance path therebetween.

In an image processing device according to this aspect of the invention, the portion of the covers near the image processing unit will not separate greatly from the conveyance path when the covers open and close because the image processing unit is located at a position opposite the pivot pins of the pair of covers. Because a large space is not formed near the image processing unit when the covers open and close, the image processing unit is protected from the outside.

In an image processing device according to another aspect of the invention, the pair of pivot pins are disposed in a direction intersecting the conveyance direction of the process medium in the conveyance path, and are separated from each other in the conveyance direction; the image processing unit has a process surface disposed facing the conveyance path; and the process surface is disposed positioned between the pair of pivot pins.

In an image processing device according to this aspect of the invention, a space is created in a position opposite the process surface, which allow for placement of an inkjet head capping mechanism, for example, in this space.

Preferably, the pair of covers pivot on their respective pivot pins of the pair of pivot pins, and can rotate to a position opposite the process surface with the conveyance path therebetween.

Because the pair of covers rotate to a position opposite the process surface with the conveyance path therebetween, the space opposite the image processing unit is closed by the covers in the image processing device according to this aspect of the invention, and access to the image processing unit from the direction opposite the process surface can be prevented. The image processing unit can therefore be reliably protected from the outside.

Even more preferably, in an image processing device according to another aspect of the invention, a capping member that closes the space opposite the image processing unit is disposed between the pair of pivot pins.

In the image processing device according to this aspect of the invention, access from the direction opposite the process surface is prevented by the capping member that closes the space opposite the process surface. The image processing unit can therefore be more reliably protected from the outside.

Preferably, in an image processing device according to another aspect of the invention, the image processing unit is a fluid ejection head having an ejection nozzle that ejects a fluid, and a capping mechanism that can close the ejection nozzle is positioned opposite the image processing unit with the conveyance path therebetween.

The image processing device according to this aspect of the invention can also protect the capping mechanism when the covers are open because the capping mechanism is located on the opposite side of the conveyance path as the image processing unit, which is protected from the outside even when the pair of covers are open. The ejection nozzle can also be more reliably protected by closing the space opposite the ejection nozzle with the capping mechanism.

Another aspect of the invention is an image processing device including: a conveyance path through which process media is conveyed; an image processing unit disposed with a process surface facing the conveyance path; and a pair of covers that pivot on a pair of pivot pins, respectively, the pair of pivot pins intersecting the conveyance direction of the conveyance path to open and close the conveyance path and are formed extending away from the pivot pins, being disposed on the upstream side and downstream side of the conveyance path, respectively, with the image processing unit between the pivot pins, covering the conveyance path when the conveyance path is closed, and rotating to a position opposite the process surface when the conveyance path is open.

Because the pair of covers rotate to a position opposite the process surface in this aspect of the invention, the process surface is covered by the covers when the conveyance path is opened in the image processing device, thereby protecting the process surface from the outside when the conveyance path is open.

Preferably, in this image processing device, the pair of covers pivot horizontally.

Because the pair of covers will be returned by their own weight to the closed position after opening, an image processing device according to this aspect of the invention protects the process unit from the outside more reliably than in a configuration in which the pair of covers pivot vertically.

In another aspect, the invention includes an attachment structure for a cover that can open and close to cover a conveyance path of a process media on which the image processing device performs an image process: the cover including an upstream-side cover that covers the upstream side of the conveyance path, and a downstream-side cover that covers the downstream side of the conveyance path; the upstream-side cover and the downstream-side cover are pivotally supported by and attached to open and close on an upstream-side pivot pin and a downstream-side pivot pin, respectively; the upstream-side pivot pin and downstream-side pivot pin being disposed opposite a protected part of the conveyance path where the image process is performed with the conveyance path therebetween.

With the cover attachment structure according to this aspect of the invention, the upstream-side pivot pin and downstream-side pivot pin are disposed opposite the protected part with the conveyance path therebetween, thereby shielding the protected part from the upstream and downstream sides of the conveyance path, and protecting the members disposed in the protected part from the outside.

In a cover attachment structure according to another aspect of the invention, a printhead that prints on the process media is disposed in the protected part.

An image processing device using the cover attachment structure according to this aspect of the invention protects the printhead, which can be easily soiled if touched by the user, even when the cover is open.

In a cover attachment structure according to another aspect of the invention, the printhead is an inkjet head, and a capping space is formed between the upstream-side pivot pin and the downstream-side pivot pin, a cap for the inkjet head being disposed within the capping space.

The cover attachment structure according to this aspect of the invention protects the inkjet head, which can easily be soiled if touched by the user, and the cap that protects the inkjet head, from the outside.

Other objectives and embodiments of the invention, as well as a fuller understanding of the invention, will become apparent upon reference to the following description and claims in conjunction with the accompanying drawings.

DESCRIPTION OF EMBODIMENTS

Embodiments of a check processing device according to the present invention are described below with reference to the accompanying figures.

Basic Structure

Figure 1:
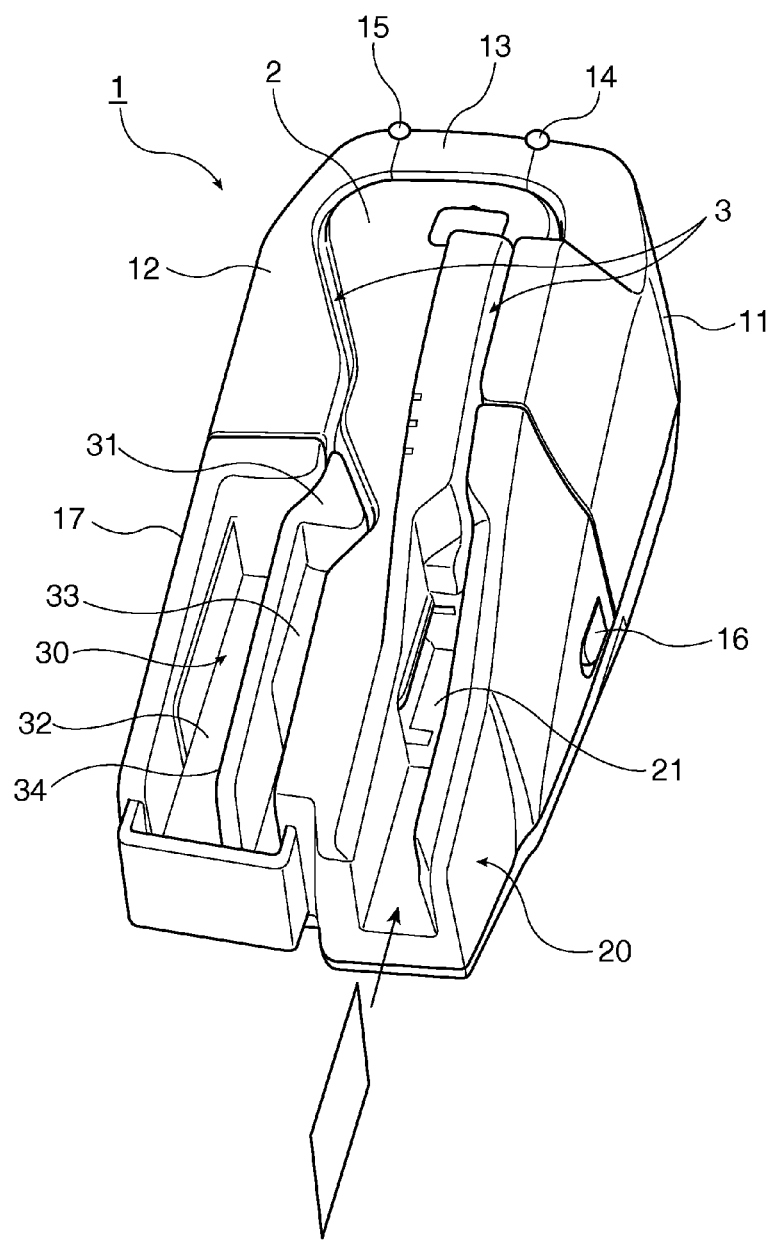
FIG. 1 is an oblique view of a check processing device according to a preferred embodiment of the invention.

FIG. 1 is an oblique view of a check processing device 1 according to this embodiment of the invention. The check processing device 1 includes a main case 2, a middle cover 13 affixed to the main case 2, and a pair of access covers 11, 12 that are pivotally connected to the middle cover 13 by hinges (pivot pins) 14, 15, respectively.

A conveyance path 3 for conveying checks as the processed media from the upstream side to the downstream side is formed around the outside of the main case 2 in a basic U-shaped configuration when seen from above. The pair of access covers 11, 12 are formed along the conveyance path 3 on the outside of the conveyance path 3 so that they the access cover the upstream side and downstream sides of the conveyance path 3, respectively. The middle cover 13, disposed between the access covers 11, 12, covers the middle part of the conveyance path 3. The hinges 14, 15 are disposed with the pivot pins positioned in a direction that intersects the conveyance direction of the conveyance path 3, and the access covers 11, 12 are pivotally attached by hinges 14, 15 to the middle cover 13.

A paper feed unit 20 is disposed at the upstream end of the conveyance path 3. The paper feed unit 20 includes an in-feed mechanism having a feed roller and a drive motor (not shown) that feeds checks to the upstream end of the conveyance path 3, and a separation mechanism, such as a separation pad or a retard roller. Preferably, the loading pocket 21 of the paper feed unit 20 into which checks to be processed are dropped is open to the top and side of the check processing device 1 so that checks can be fed into the check processing device 1 from two directions, the top and the side. The checks, which have a printed surface on the front side, are loaded into the loading pocket 21 with the printed front side facing the outer side of the conveyance path 3, and are conveyed standing vertically on edge through the conveyance path 3.

A discharge unit 30 into which the checks are discharged is disposed at the downstream end of the conveyance path 3. The discharge unit 30 includes a path selection mechanism 31 disposed rotatably to the main case 2, and a first exit pocket 32 and second exit pocket 33 disposed downstream from the path selection mechanism 31. Checks discharged from the conveyance path 3 are sorted by the path selection mechanism 31 into the first exit pocket 32 or the second exit pocket 33, which are separated by a divider 34.

The internal structure of the check processing device is described next with reference to FIG. 2, which is a top view of the check processing device 1 wherein the internal parts are denoted by dotted lines.

A printhead (image processing unit) 40 is disposed in the main case 2 at a middle position midway between the upstream end and the downstream end of the conveyance path 3 (at the bottom of the U-shape of the conveyance path 3). The printhead 40 is disposed opposite the gap between the pair of hinges 14, 15 with the ejection surface (process surface) 41 in which ejection nozzles are formed facing the conveyance path 3. The check processing device 1 can be more compactly constructed by disposing the printhead 40 inside the main case 2 on the inside of the U-shaped conveyance path 3.

An inkjet printhead that prints on checks by ejecting ink can be used as the printhead 40. A line printhead 40 that extends across the width of the check (the dimension perpendicular to the conveyance direction) may also be used.

A capping mechanism 42 capable of capping the ejection nozzles in the ejection surface 41 when the printhead 40 is not printing is disposed between the hinges 14, 15 opposite the ejection surface 41 with the conveyance path 3 passing therebetween, the capping mechanism 42 being covered by the middle cover 13.

The capping mechanism 42 has a cap unit that covers the ejection surface 41 so that the ejection nozzles are closed, preventing evaporation of ink from the nozzles when not printing and preventing ink from clogging the nozzles. The capping mechanism 42 has a drive unit that moves the cap unit into contact with the ejection surface 41 when the printhead 40 is not printing, and retracts the cap unit from the ejection surface 41 to a position not interfering with check conveyance when the printhead 40 prints.

A magnet 51 capable of magnetizing magnetic ink printed on checks is disposed inside access cover 11 on the downstream side of the paper feed unit 20. Downstream from the magnet 51 and upstream of the printhead 40, a magnetic scanner 52 capable of reading magnetic information is disposed inside access cover 11 with the scanning surface facing the conveyance path 3. A pressure pad 53 that presses checks to the scanning surface of the magnetic scanner 52 is disposed opposite the magnetic scanner 52 with the conveyance path 3 passing therebetween. An MICR head can be used as the magnetic scanner 52.

Optical scanners 54, 55 capable of reading the back and front sides of checks are disposed with the conveyance path 3 passing therebetween downstream from the printhead 40 on the main case 2 and access cover 12, respectively, and can capture images of the front and back sides of the passing checks as the checks are conveyed along the conveyance path. Contact image scanners can be used as the optical scanners 54, 55.

The check processing device 1 also has a plurality of conveyance roller pairs 61a to 64b that convey checks from the upstream side to the downstream side of the conveyance path 3. These plural conveyance roller pairs 61a to 64b are disposed with conveyance rollers 61a, 62a, 63a, 64a disposed to the main case 2 opposite conveyance rollers 61b, 62b, 63b, 64b disposed to the access covers 11, 12 with the conveyance path 3 therebetween. The conveyance rollers 61a, 62a, 63a, 64a disposed within the main case 2 are connected by a common endless belt to a paper feed motor not shown, and are synchronously and rotationally driven so as to convey the process media along the conveyance path.

Basic Operation

Checks loaded into the loading pocket 21 of the check processing device 1 are, for example, fed by the in-feed roller (not shown) of the paper feed unit 20, separated one at a time by the separation roller or other sheet separating mechanism, and conveyed to the upstream end of the conveyance path 3.

The check conveyed into the conveyance path 3 from the paper feed unit 20 is held and conveyed by the first roller pair 61a, 61b, and magnetic ink on the check is magnetized by the magnet 51. The check is pressed to the magnetic scanner 52 by the pressure pad 53, and the magnetized magnetic ink is read by the magnetic scanner 52. The magnetic information that is read is sent to an external host computer, for example. The check is then held by the second roller pair 62a, 62b, and conveyed through the curved part of the access cover 11 to the printhead 40 as the conveyance direction curves by approximately 90 degrees.

When the check is conveyed by the second roller pair 62a, 62b to the position opposite the printhead 40, the printhead 40 prints on the back side of the check opposite the front side having the printed surface based on input from the external host computer, for example. The printed check is then held by the third roller pair 63a, 63b and conveyed to the optical scanners 54, 55 while the conveyance direction curves approximately 90 degrees again through the curved part of the access cover 12. The optical scanners 54, 55 then read the back and front sides of the check, and send the captured image information to the host computer. After passing the optical scanners 54, 55, the check is held and conveyed by the fourth roller pair 64a, 64b, [4b, sic] and discharged into the discharge unit 30.

If the check information could not be read by the magnetic scanner 52, the check can be conveyed without the back side being printed on by the printhead 40 and the path selection mechanism 31 rotated so that the check is discharged into the second exit pocket 33. By discharging normally processed checks into the first exit pocket 32, and discharging checks that were not normally processed into the second exit pocket 33, checks that were correctly processed checks and checks that were not correctly processed can be easily separated and removed.

Because the check processing device 1 according to this embodiment of the invention can read and write checks in a single operation, check processing is made easier for the teller or other users processing checks.

Eliminating Paper Jams

Figure 2:
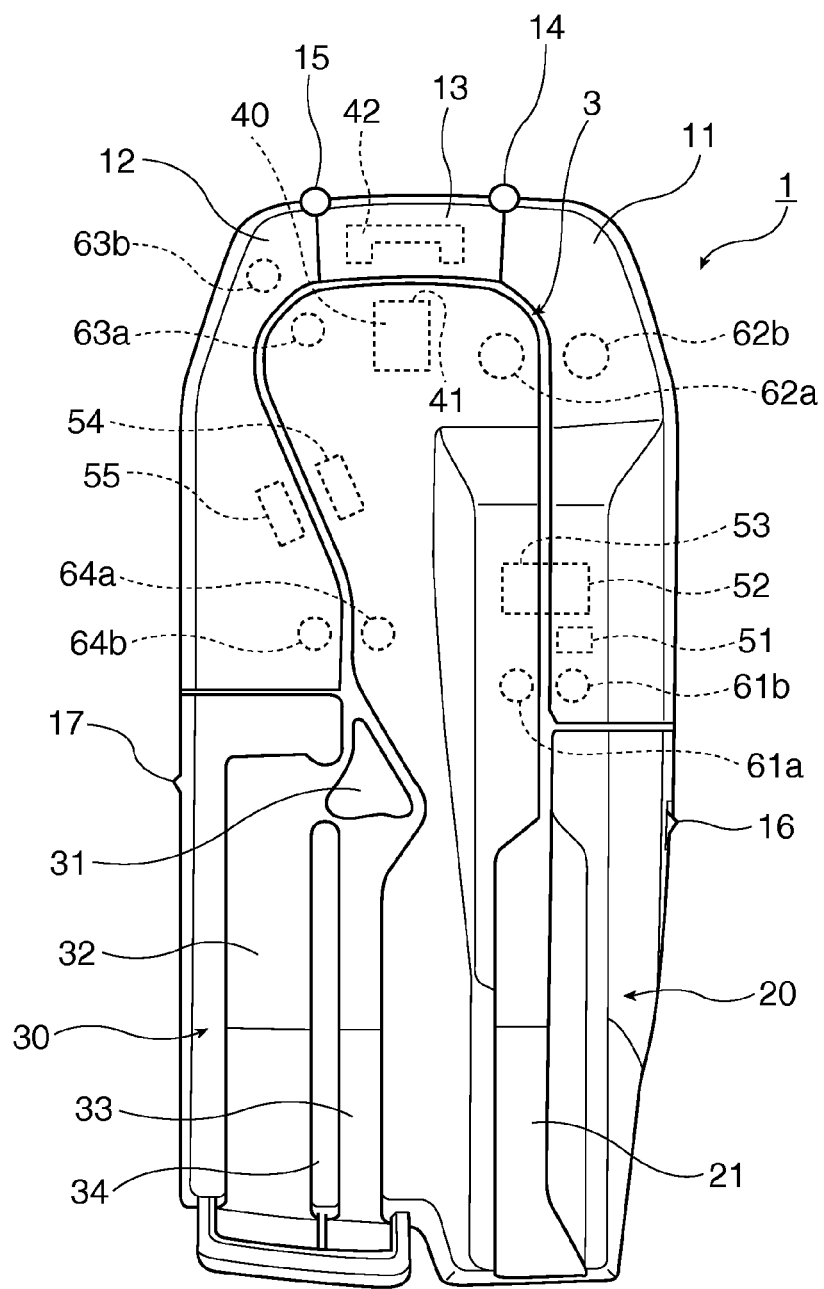
FIG. 2 is a top view of the check processing device according to a preferred embodiment of the invention.

In the check processing device 1 according to this embodiment of the invention, lock mechanisms 16, 17 engages and holds the ends of the access covers 11, 12 opposite the hinges 14, 15 to the paper feed unit 20 and discharge unit 30 when in the closed cover position shown in FIG. 1 and FIG. 2. Note that a variety of slide lock mechanisms or other locking mechanism known could be used for lock mechanisms 16, 17 in accordance with the claimed invention.

Figure 3:
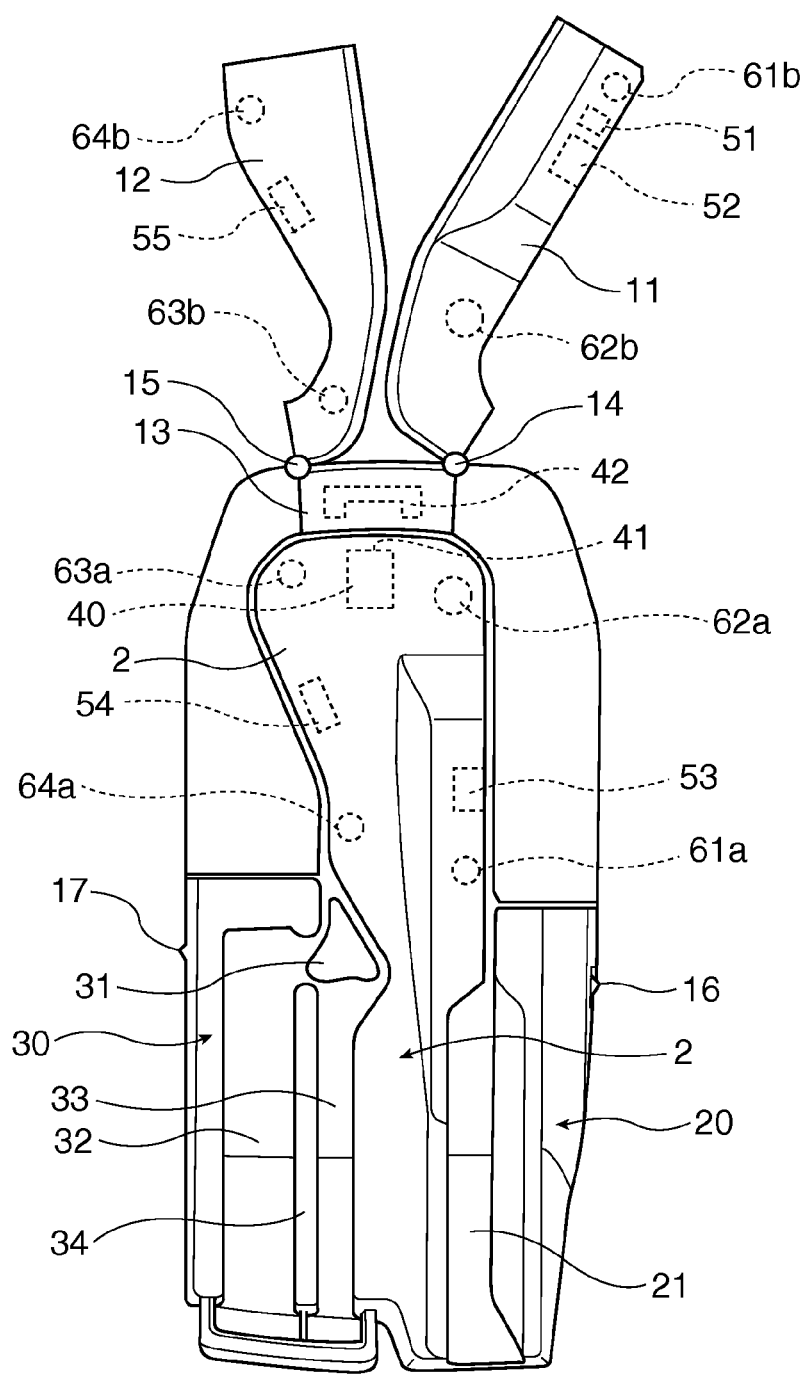
FIG. 3 shows the check processing device in FIG. 2 when the access covers are open.

The hinges 14, 15 of the access covers 11, 12 are disposed so as to extend in a direction intersecting the media conveyance direction (that is, vertically in line with the paper surface in the example shown in FIGS. 1-4). As a result, when the lock mechanisms 16, 17 are released, the access covers 11, 12 pivot on the hinges 14, 15 as shown in FIG. 3, so that the ends of the access covers 11, 12 opposite the hinges 14, 15 move away from the conveyance path 3, and the conveyance path 3 is opened to the sides of the check processing device 1 without the access covers 11, 12 interfering with each other.

Preferably, the pressure pad 53, optical scanner 54, and conveyance rollers 61*a*, 62*a*, 63*a*, 64*a* are attached to the main case 2, and the magnet 51, magnetic scanner 52, optical scanner 55, and conveyance rollers 61*b*, 62*b*, 63*b*, 64*b* are attached to the access covers 11, 12. In this embodiment, when the access covers 11, 12 swing open, the conveyance path 3 is opened so that the plural conveyance rollers 61*a* to 64*a*, and the reading surfaces of the magnetic scanner 52 and optical scanners 54, 55 are exposed to the outside.

Therefore, when a check becomes jammed during conveyance through the conveyance path 3, the conveyance path 3 can be exposed to the side by opening the access covers 11, 12, and the check jammed in the conveyance path 3 can be easily removed from a side of the check processing device 1 without interfering with the magnetic scanner 52 or other parts.

Protecting the Printhead when the Access Covers are Open

In the check processing device 1 according to this embodiment of the invention, the hinges 14, 15 of the access covers 11, 12 are disposed near the ejection surface 41 of the printhead 40. In this configuration, the parts of the access covers 11, 12 near the hinges 14, 15 therefore do not move greatly when the access covers 11, 12 swing open to remove a check jammed in the conveyance path 3, and remain closed to the ejection surface 41 even when the access covers 11, 12 are open. Because a large space is not opened around the printhead 40, external access to the printhead 40 is prevented by the access covers 11, 12, and the printhead 40 can be protected from the outside even when the access covers 11, 12 are open.

The positions of the hinges 14, 15 that are the pivot axes of the access covers 11, 12 do not change when the access covers 11, 12 pivot. As described above, the hinges 14, 15 are located near the ejection surface 41 on the upstream and downstream sides of the ejection surface 41 in the conveyance direction, respectively. The ejection surface 41 of the printhead 40 is therefore sheltered from the upstream and downstream sides of the conveyance path 3 by the hinges 14, 15 even when the access covers 11, 12 are open. More specifically, the printhead 40 can be more reliably protected because the user cannot access the printhead 40 from the upstream or downstream sides of the conveyance path 3.

Furthermore, the capping mechanism 42 and the middle cover 13 that covers the capping mechanism 42 are disposed as capping members in the space opposite the ejection surface 41 of the printhead 40, thereby closing the space opposite the ejection surface 41. The ejection surface 41 is thus covered by the capping mechanism 42 and middle cover 13 so as to prevent exposure to the outside even when the access covers 11, 12 are open, thereby more reliably protecting the printhead 40 from the outside.

Yet further, as shown in FIG. 3, the access covers 11, 12 pivot to a position opposite the ejection surface 41 with the conveyance path 3 passing therebetween when the covers are open. This allows the printhead 40 to be more reliably protected since the open access covers 11, 12 restrict access to the printhead 40 from the direction opposite the ejection surface 41.

Additionally, positioning the hinges 14, 15 of the access covers 11, 12 to extend vertically allows the access covers 11, 12 to pivot horizontally. This configuration allows the access covers 11, 12 to be held open with improved stability than in a configuration in which the access covers 11, 12 swing vertically where the access covers 11, 12 may inadvertently swing closed due to their own weight. Thus, this aspect further allows jammed checks to be more easily removed, since the access covers 11, 12 can be held in a more stable position while concurrently restricting access to and protecting the printhead 40.

Although a preferred embodiment of the invention is described above, the technical scope of the invention is not limited to the scope of the foregoing embodiment. Thus, the foregoing embodiment can be modified and improved in many ways without departing from the scope of the accompanying claims as would be appreciated by one of ordinary skill in the art.

Although the printhead 40 is described as being an inkjet head in the foregoing embodiment, the present invention may be used with any image processing unit where protection from the outside is desired. For example, an optical scanner whose scanning accuracy can be reduced by soiling of the scanning surface could obviously be disposed in the protected part between the hinges 14, 15, similar to the embodiments described above. In addition, although the printhead 40 is described as being disposed in the protected part between hinges 14, 15 in the foregoing embodiment, a configuration that disposes and protects plural units, such as the printhead and optical scanner, from the outside as needed in the protected part between the upstream and downstream access covers 11, 12 would also be in accordance with the principles of the present invention.

Figure 4:
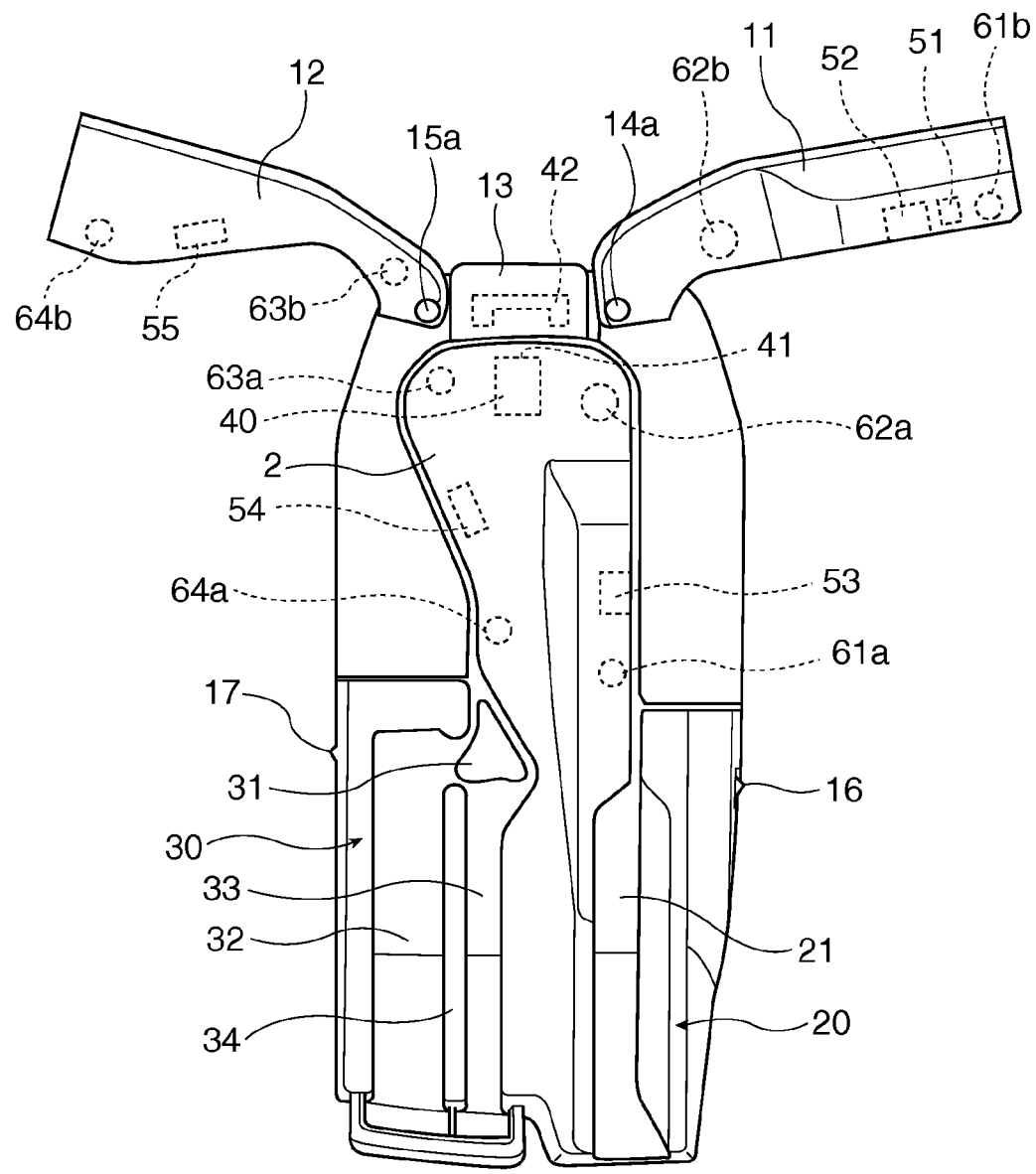
FIG. 4 shows the check processing device according to another embodiment of the invention when the access covers are open.

Additionally, although the access covers 11, 12 are described as pivotally attached by hinges 14, 15 on the outside of the access covers 11, 12 in the foregoing embodiment, a configuration in which pivot pins 14*a*, 15*a* are disposed on the printhead 40 side of the access covers 11, 12 is also conceivable, such as shown in FIG. 4 for example.

Yet further, instead of pivoting to a position where the access covers 11, 12 are completely opposite the printhead 40 as shown in FIG. 3, the present invention may include a configuration in which the middle cover 13 prevents access from the direction opposite the printhead 40, and the pivot pins 14a, 15a of the access covers 11, 12 block access from the upstream and downstream sides of the printhead 40, such as shown in FIG. 4 for example.

Furthermore, although the magnetic scanner 52 and optical scanner 55 are described as disposed within and attached to the access covers 11, 12, and the entire conveyance path 3 except for the part near the printhead 40 is open to the outside when the access covers 11, 12 are open is the foregoing embodiment, in some embodiments, some parts, such as the magnetic scanner, may be fixed to the main case 2 so long as it would not interfere with removing the process media.

Although the invention is described as a check processing device 1 in the foregoing embodiments, one of skill would appreciate that the present invention may include other types of image processing devices, including but not limited to printers for printing receipts, page scanners, and other types of optical scanners.

Given the embodiments and principles described herein, it is appreciated that the present invention may be varied in many ways. Such variations are not to be regarded as a departure from the spirit and scope of the invention, and all such modifications as would be appreciated by one skilled in the art are included within the scope of the present invention, which is limited only by the following claims.

What is claimed is:

1. An image processing device comprising:
a conveyance path that conveys process media in a specific conveyance direction;
an image processing unit disposed so that a process surface of the image processing unit faces the conveyance path;
first and second pivot pins that intersect the conveyance direction and are disposed along the conveyance path adjacent the conveyance path, wherein the conveyance path passes between the process surface and the first and second pivot pins; and
a cover that includes an upstream-side cover that covers the upstream side of the conveyance path and a downstream-side cover that covers the downstream side of the conveyance path,
wherein the upstream-side cover and the downstream-side cover are disposed along the conveyance path and can open and close by pivoting on the first and second pivot pins, respectively, wherein the upstream-side cover and the downstream-side cover cover the conveyance path when closed and the upstream-side cover has a pivotal axis at a position in an end area thereof on the downstream side of the conveyance path and the downstream-side cover has a pivotal axis at a position in an end area thereof on the upstream side of the conveyance path, and wherein the first pivot pin and the second pivot pin are disposed on the upstream side and downstream side of the process surface in the conveyance direction, respectively.

2. The image processing device described in claim 1, wherein each of the upstream-side cover and the downstream-side covers are rotatable about the respective pivot pin to an open position, wherein the first and second covers are disposed opposite the process surface with the conveyance path passing therebetween when in the open position.

3. The image processing device described in claim 1, wherein the upstream-side cover and the downstream-side covers pivot horizontally.

4. The image processing device described in claim 1, wherein the pair of pivot pins are separated from each other in the conveyance direction, and
wherein the image processing unit has a process surface facing the conveyance path between the pair of pivot pins.

5. The image processing device described in claim 1, further comprising:
a capping member that closes a space opposite the image processing unit, the capping member being disposed between the pair of pivot pins.

6. The image processing device described in claim 1, wherein the image processing unit is a fluid ejection head having an ejection nozzle that ejects a fluid, and further comprising:
a capping mechanism that can close the ejection nozzle, the capping mechanism being disposed in a position opposite the image processing unit with the conveyance path therebetween.

7. An image processing device comprising:
a conveyance path that conveys process media in a specific conveyance direction;
an image processing unit disposed so that a process surface of the image processing unit faces the conveyance path;
first and second pivot pins that intersect the conveyance direction and are disposed along the conveyance path adjacent the conveyance path, wherein the conveyance path passes between the process surface and the first and second pivot pins; and
a first cover and a second cover that are disposed along the conveyance path and can open and close by pivoting respectively on the first and second pivot pins, wherein the first and second covers cover the conveyance path when closed, wherein each of the first and second covers have a pivotal axis at a position in an end area thereof nearer the image processing unit than another respective end area thereof, and wherein each of the first and second covers are rotatable about the respective pivot pin to an open position, wherein the first and second covers are disposed opposite the process surface with the conveyance path passing therebetween when in the open position.

8. The image processing device described in claim 7, wherein the first pivot pin and the second pivot pin are disposed on the upstream side and downstream side of the process surface in the conveyance direction, respectively.

9. The image processing device described in claim 7, wherein the first cover and the second cover pivot horizontally.

10. The image processing device described in claim 7, wherein the pair of pivot pins are separated from each other in the conveyance direction, and
wherein the image processing unit has a process surface facing the conveyance path between the pair of pivot pins.

11. The image processing device described in claim 7, further comprising:
a capping member that closes a space opposite the image processing unit, the capping member being disposed between the pair of pivot pins.

12. The image processing device described in claim 7, wherein the image processing unit is a fluid ejection head having an ejection nozzle that ejects a fluid, and further comprising:
a capping mechanism that can close the ejection nozzle, the capping mechanism being disposed in a position opposite the image processing unit with the conveyance path therebetween.

13. The image processing device described in claim 8, wherein the first cover and the second cover pivot horizontally.

14. An image processing device comprising:
- a conveyance path that conveys process media in a specific conveyance direction;
- an image processing unit disposed so that a process surface of the image processing unit faces the conveyance path;
- first and second pivot pins that intersect the conveyance direction and are disposed along the conveyance path adjacent the conveyance path, wherein the conveyance path passes between the process surface and the first and second pivot pins;
- a cover that includes an upstream-side cover that covers the upstream side of the conveyance path and a downstream-side cover that covers the downstream side of the conveyance path, wherein the upstream-side cover and the downstream-side cover are disposed along the conveyance path and can open and close by pivoting on the first and second pivot pins, respectively, wherein the upstream-side cover and the downstream-side cover cover the conveyance path when closed, and wherein an upstream side of the upstream-side cover is rotatable about the first pivot pin to an open position and a downstream side of the downstream-side cover is rotatable about the second pivot pin to an open position; and
- a capping member that closes a space opposite the image processing unit, the capping member being disposed between the pair of pivot pins.

15. The image processing device described in claim 14, wherein the upstream-side cover and the downstream-side covers pivot horizontally.

16. The image processing device described in claim 14, wherein the pair of pivot pins are separated from each other in the conveyance direction, and
- wherein the image processing unit has a process surface facing the conveyance path between the pair of pivot pins.

* * * * *